United States Patent [19]

Micallef

[11] 4,033,487
[45] July 5, 1977

[54] DOUBLE TRIGGER PUMP

[75] Inventor: Lewis A. Micallef, Fort Lee, N.J.

[73] Assignee: Leeds and Micallef, Fort Lee, N.J.

[22] Filed: Oct. 8, 1975

[21] Appl. No.: 620,565

[52] U.S. Cl. .............................. 222/207; 222/321; 222/324; 222/509; 239/526

[51] Int. Cl.² ........................................ G01F 11/08

[58] Field of Search .......... 222/320, 321, 505, 509, 222/402.15, 324, 207; 239/333, 526

[56] References Cited

UNITED STATES PATENTS

| 2,737,329 | 3/1956 | Bolsey | 222/321 X |
|---|---|---|---|
| 3,429,484 | 2/1969 | Baldwin | 222/509 X |
| 3,452,905 | 7/1969 | Micalleff | 222/321 X |
| 3,515,316 | 6/1970 | Green | 222/505 X |
| 3,726,444 | 4/1973 | Ostrowsky | 222/505 X |
| 3,726,445 | 4/1973 | Ostrowsky et.al. | 222/505 X |

Primary Examiner—Stanley H. Tollberg
Assistant Examiner—Frederick R. Handren
Attorney, Agent, or Firm—Kane, Dalsimer, Kane, Sullivan and Kurucz

[57] ABSTRACT

A dispensing pump including a double trigger mechanism for actuating a reciprocal plunger having a through passage for communication with the pump at one end and a nozzle at the other end. The trigger mechanism includes a body portion and structure on the body portion for pivotally mounting the trigger on the plunger. A pair of angularly spaced handles extend from the body portion and extend from the plunger and pump to permit the grasping thereof. The trigger mechanism is interengaged with the plunger so that movement of either handle or in a further embodiment both handles will pivot the body portion and move the plunger in one direction and release of the handle will permit the plunger to reciprocate to the original position by pivoting the body portion and handle to the original position.

18 Claims, 9 Drawing Figures

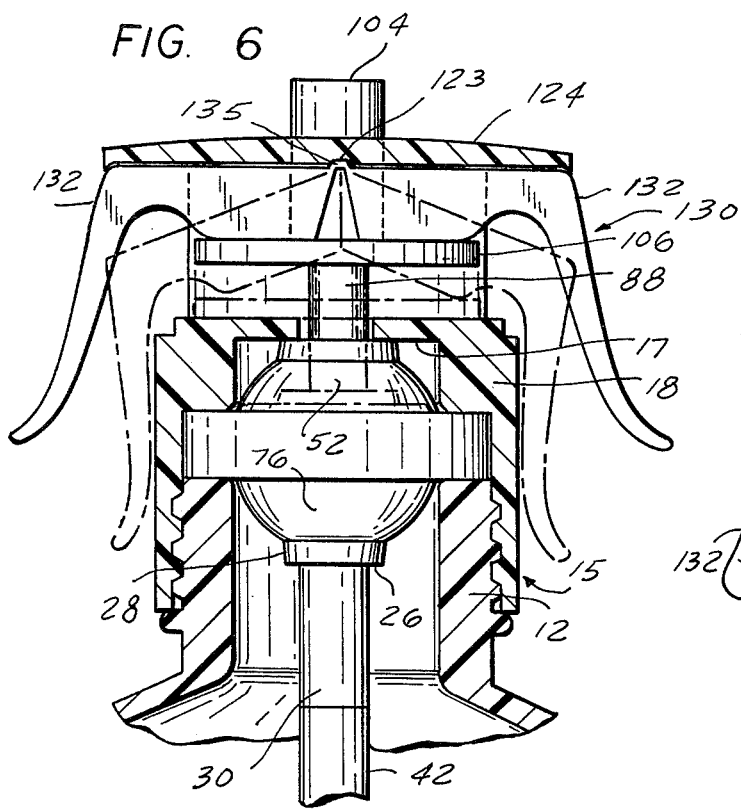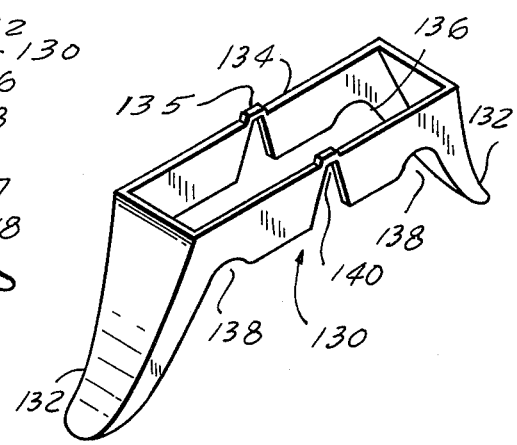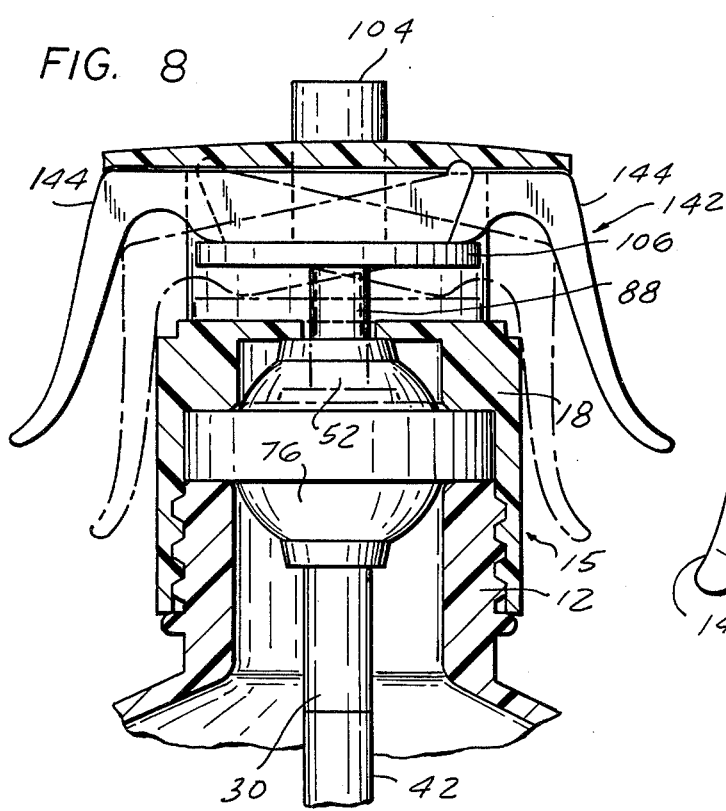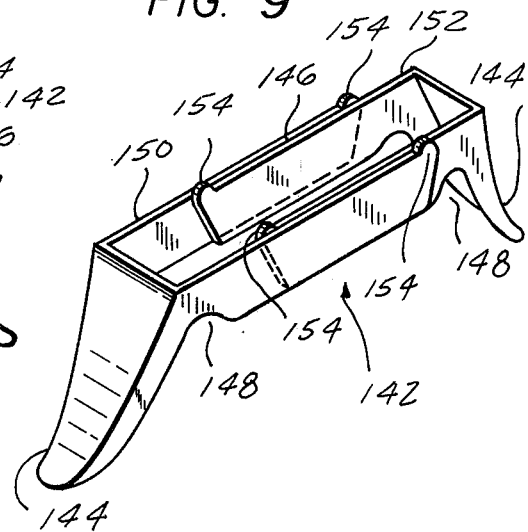

DOUBLE TRIGGER PUMP

BACKGROUND OF THE INVENTION

The present invention relates to fluid dispensing trigger actuated pump for containers and, more particularly, to plunger actuator pumps of the type that are used for discharging liquid or gaseous or pasty substances from containers, such as bottles. An example of the pump mechanism employed is present in U.S. Pat. No. 3,452,905.

Reciprocal pumps of one type or another have been proposed for dispensing material from a container. Containers of this type have been used for handling and dispensing materials of a wide variety as those commonly marketed in the cosmetic, toiletry, food and household products industries. Although these prior pumps were generally satisfactory and acceptable, there has always been an ever increasing need insofar as consumer products are concerned for pumps of better construction and superior as well as efficient performance but, most important of all, the need is always present for a pump of simple design in construction which is materially lower in cost of construction, manufacture and assembly and is easy and efficient to utilize. An example of a pump satisfying this need is disclosed in U.S. Pat. No. 3,452,905.

In recent years and continuing to the present, there has been an ever increasing consumer preference for trigger actuated pumps.

The present invention combines the attributes of the above identified patented pump with a double acting trigger adapter.

SUMMARY OF THE INVENTION

It is, accordingly, among the principal objectives of the present invention to provide a double acting trigger mechanism from a dispensing pump with a reciprocal plunger terminating in a nozzle at its discharge end and which operates reliably, efficiently and easily while being of simple construction and being relatively inexpensive to manufacture and assemble.

In summary, a double acting trigger mechanism is employed for a dispensing pump of the type employing a reciprocal plunger having a through passage for communication with a pump at one end and a nozzle at the other end. The trigger mechanism includes a body portion with means on the body portion for pivotally mounting the trigger on the plunger. A pair of angularly spaced handles extend from the body portion and extend from the plunger and pump to permit grasping thereof by the finger of a hand. The trigger is interengaged with the plunger so that movement of either or both in a further embodiment will pivot the body portion and move the plunger in one direction. Thereafter, release of the handle will permit the plunger to reciprocate to the original position by pivoting the body portion and handle to the original position.

Other objects and advantages will become apparent from the following detailed description which is to be taken in conjunction with the accompanying drawings illustrating somewhat preferred embodiments of the invention.

BRIEF DESCRIPTION OF THE DRAWINGS

In the drawings:

FIG. 6 is an enlarged fragmentary longitudinal sectional view of an alternative form of the pump utilizing a different trigger mechanism;

FIG. 7 is a perspective view of the alternative trigger mechanism utilized in the embodiment of FIG. 6;

FIG. 8 is an enlarged fragmentary longitudinal sectional view of a second alternative form of the dispensing pump utilizing a second alternative form of trigger mechanism; and FIG. 9 is a perpective view of the second alternative form of trigger mechanism utilized in the embodiment of FIG. 8.

DESCRIPTION OF THE PREFERRED EMBODIMENTS

Figure 1:
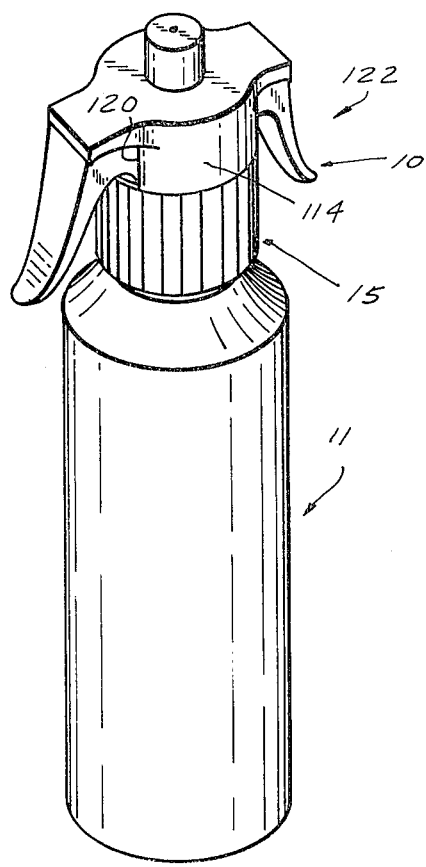
FIG. 1 is a perspective view of a capped container incorporating a reciprocal dispensing pump in accordance with the present invention.

In the drawings, the reciprocal dispensing pump 10 of this invention is shown disposed across the opening of a container 11 which may assume the form of any conventional bottle or similar receptable, made of glass, plastic or other suitable materials. The container may be used for holding and dispensing a wide variety of materials generally in liquid form as may be found on the market today. These liquids may possess different degrees of viscositites and may also include oil, perfume or the like, or pasty substances such as creams or the like, or gaseous substances.

The container 11 includes a neck 12 terminating in an upper end 13 defining an opening into the container interior. Threads 14 on the exterior of the neck 12 conveniently support a cap 15 having a substantially coaxial opening 16 in top wall 17 which extends inwardly from the reduced substantially cylindrical skirt 18. Obviously, any other form of securing means between the cap 15 on the neck 12 may be employed either as a permanent or temporary nature.

Pump 10 is conveniently mounted across the opening defined by the neck 12 of the container by means of the cap 15 and may be of any construction employing a reciprocal plunger including the aforenoted patented pump which will be illustrated for convenience. Pump 10 includes a bottom substantially rigid wall defined by member 20 having a substantially circular peripheral flange 22 and a substantially dish-shaped body portion 24 inwardly thereof. The base or bottom member 20 includes a substantially flat base 26 extending inwardly of the substantially conical wall 28 which forms an extension of the dished body portion 24. A substantially cylindrical tube 30 extends downwardly and integrally from the base 26 which, together with the tube defines a substantially coaxial bore 32 serving as a liquid passage. The tube 30 is provided with a valve seat 34 for defining a sealing zone along with a ball check valve 36. The interior of the tube 30 may also be furnished with retaining elements for preventing undue displacement vertically of the ball check valve 36. The lower end of the tube 30 is provided with a reduced boss 40 for receiving a conventional dip tube 42 for conducting liquid to be dispensed from the container interior.

The peripheral flange 22 of the bottom member 20 is provided with a substantially circular air passage in the form of recess 44. This recess has extending therefrom passage 46 which communicates with the container interior and which, as will become evident shortly, forms part of an air passage network for replenishing the container with air as the liquid therein is dispensed. The flange 22 is also provided with a circumferentially extending recess 48 and another substantially circular recess 50 for mating with surfaces of the flexible top member 52 for interconnecting the bottom member 20 and top flexible member 52 in a substantially sealed manner.

Reference is now made to the flexible top member 52 which operates as a pump diaphragm. The diaphragm 52 includes a peripherally extending flange 54 resting on the flange 22 of the bottom member 20 in a substantially liquid tight manner while under the pressure exerted by the associated surfaces of the cap 15, the tightening of which serves to seal in a liquid tight manner the peripheral junction between the top member 52 and the bottom member 20 as well as the neck 12 of the container through the sealed interengagement between the bead 58 and top edge 13 of the container 11. A depending skirt 56 extends downwardly from the flange 54 and terminates in an inwardly extending bead 58 which is conveniently received by the recess 48 for purposes of maintaining the top member 52 and bottom member 20 associated and in an assembled condition following pump assembly and prior to placement across the opening in the neck of the container 11. Of course the association of the bead 58 in the recess 48 cooperates in sealing the mating and associated surfaces of the top member 52 and bottom member 20. This seal is perfected and optimized as a result of the interengagement of surfaces of the downward projection 60 on the flange 54 and the recess 50 in the flange 22.

The diaphragm 52 further includes a flexible body portion 62 extending inwardly of the flange 54. An upstanding circular rib 64 is disposed interiorly of the flexible portion 62 and operates to seal against the bottom face of the top 17 of the cap 15 when the pump 10 is in a fully retracted position. A flat transverse shoulder 66 extends inwardly of the rib 64 and serves as a bearing surface against which pressure is applied to subject the pump to its pumping cycle for purposes of dispensing liquid. A downwardly depending enlarged boss 67 serving as a valve extends downwardly of the shoulder 66 interiorly of the flexible portion 52. The interior of the boss 67 includes a substantially inverted conical surface 70 joined with a conical surface 72 for association with the complimentary surfaces of a plunger generally designated by numeral 74 which, together with the bottom substantially rigid member 20 and flexible diaphragm 52 defines a pump chamber 76. As part of the air passage network mentioned in the above, the flange 54 of the diaphragm 52 is provided with one or more openings 78 which communicate with the circular recess 44 and the ambient atmosphere particularly when the pump is actuated through its pumping cycle and during its retraction cycle.

Figure 2:
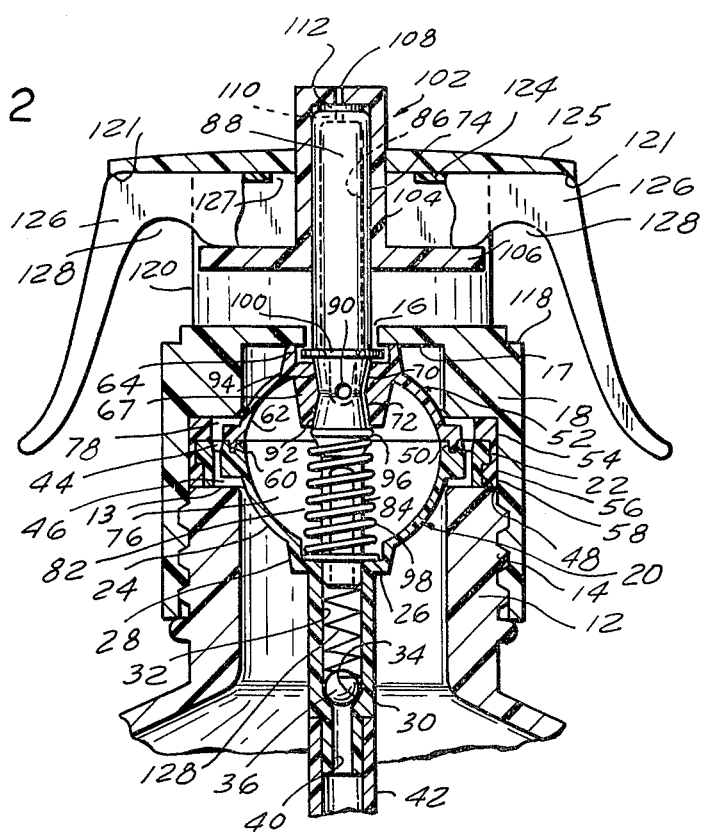
FIG. 2 is an enlarged fragmentary longitudinal sectional view through the neck and cap of the container as well as the reciprocal dispensing pump showing the pump parts in a fully extended retracted position.

Reference is now made to the plunger 74 which cooperates in deflecting the diaphragm 52 during the pumping cycle whereby the capacity of the pump chamber 76 is varied and also in providing passage of liquid during dispensing and filling of the pump chamber 76. In this connection, the plunger 74 includes a lower end 82 provided with at least one flat section 84 which cooperates with the adjacent surfaces 32 of the tube 30 in defining a liquid passage therebetween. Of course the lower end or stem 82 serves to define the path of reciprocation of the plunger 74 through its cooperation with the associated surfaces of the tube 30. The upper end of the plunger 74 includes a tubular portion 86 defining a bore 88 which is open at the upper end of the tubular portion 86 and terminates approximately midway between the ends of the plunger 74. The inner end of the bore 88 communicates with radial or transverse holes 90 which, during the pumping stroke, communicates with the liquid pump chamber 76. The opening 90 is adapted to be closed or sealed by opposed surfaces of the boss 67 of the diaphragm 52 during the retraction of the plunger 74 while, on the other hand, this valving arrangement is adapted to be opened under the influence of the internal liquid pressure building up in the pump chamber 76 as a result of the downward stroke of the plunger 74. Toward this end, the central section of the plunger 74 is provided with a conical portion 92 and an inverted conical portion 94 both of which are complementary with the conical surfaces 70 and 72 of the boss 68 of the diaphragm 52. The base of the conical portion 92 defines a shoulder 96 with the lower end of the plunger. A spring is disposed against this shoulder 96 as well as the flat face 26 of the base member 20; and in this manner, the plunger 74 is biased upwardly whereby the spring will be compressed during the pumping stroke and the plunger will be urged toward its extended upward position during the retraction stroke. A radially extending rib 100 is disposed between the upper conical portion 94 and tubular end 86 of the plunger 74 for engaging with the shoulder 66 of the central enlarged boss 68 of the diaphragm 52 during the pumping stroke to thereby assure downward deflection of the diaphragm 52 as the plunger is shifted downward. The radial rib 100 is also adapted to serve as a stop by engaging the wall 17 to thereby limit the extent of retraction of the plunger 74. Ordinarily, the rib 100 will be disposed as shown in FIG. 2 prior to actuation of the pump.

In order to facilitate depression of the plunger 74 and to direct the liquid to be dispensed in the desired direction and with the desired dispensing pattern, a plunger nozzle cap 102 is fitted over the upper tubular end 86 of the plunger. Cap 102 has a cylindrical upper portion 104 and terminates at its lower end in an annular actuating flange 106. A nozzle orifice 108 is in the closed upper end of the cap and is in alignment with a small opening 110 in the upper end of tubular portion 86 of the plunger 74 which communicates with inner bore 88. An appropriate break-up plate 112 is positioned adjacent the aligned opening 110 and orifice 108 to facilitate formation of a spray as fluid is dispensed therethrough thereby forming a nozzle arrangement at the upper end of cap 108. A cylindrical cap, and trigger housing 114 is mounted to the remainder of the cap by epoxy or other convenient means such as a force fit with the bottom annular rim 116 fitted within a corresponding annular recess 118 in the top of cap 15. A central channel 120 extends diametrically through housing 114 and is open at both ends to permit the extension of a double handled trigger mechanism 122 therethrough. The trigger mechanism is of a unitary one-piece construction of a similar material as the cap such as a plastic and includes a central body portion 124 which is rectangular in configuration and has a central aperture 127 through which the upper tubular portion 86 of the plunger extends along with the upper cylindrical portion 104 of cap 102. A rectangular central retaining plate 125, which is rectangular in configuration, covers the double trigger mechanism 122 and is utilized to retain the trigger on the plunger and captured between the undersurface of the retaining plate 125 and the upper surface of actuating flange 106. Plate 125 is integrally formed with the remainder of cap 114 or, alternatively, is fixed in position by bonding or fastening the plate to the side walls of the adjacent cylindrical cap and housing 114. Naturally, plate 125 requires an appropriate aperture for passage of cap 102 and tubular portion 86 of the plunger therethrough. Retainer recesses 121 are provided adjacent the ends of the undersurface of plate 125 to receive mating surfaces on the top of body portion 124 to assist in retaining the trigger mechanism in position.

Assembly of the trigger and cap portion of the device occurs in the following manner. The upper end of plunger 74 extends through aperture 16. Cap 102 is positioned over the exposed end of plunger 74 until seated with break-up plate 112 in alignment with openings 108 and 110. Double trigger mechanism 122 with a central aperture 127 is then positioned with cap 102 extending through aperture 127 and the bottom surface of trigger mechanism 122 seats on actuating flange 106. Cap 114 and cover plate 125 is then positioned over cap 102 with the cap passing through a central aperture in plate 125 and is moved downward until the bottom annular rim 116 of cap 114 mates with annular surface 118. In this position, the undersurface of plate 125 captures trigger mechanism 122 in position with the trigger handles extending through channel 120. As stated above, the cap 114 can be epoxied or friction fit in place at the point of mating surfaces 116 and 118. This completes the assembly of the trigger mechanism and holding cap to the remainder of the device.

Figure 3:
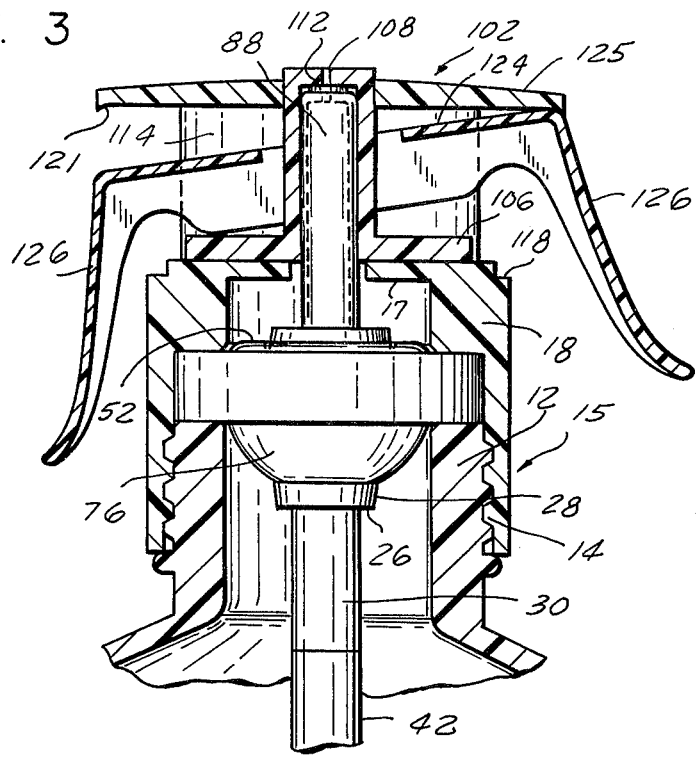
FIG. 3 is an enlarged fragmentary sectional end view through the neck and cap of the container as well as the reciprocal dispensing pump showing the pump parts in a fully extended retroacted position.

On each side of rectangular body portion 124 is a downwardly and outwardly extending handle 126 so as to provide a pair of diametrically opposed handles 126. At the point where each handle 126 adjoins body portion 124 there is an undercut arcuate recess 128 which facilitates pivoting of handles 126 when operation of the dispenser is desired. When either of the handle 126 is depressed downwardly and toward the cap the undersurface of body portion 124 will force actuating flange downward thereby forcing the plunger downward and actuating the pump to dispense fluid as depicted in FIG. 3. Release of the handle will permit spring 98 to return the plunger, the actuating plate 106 and the double trigger assembly 122 to the initial position.

Sufficient clearance is provided between double trigger assembly 122 and the channel 120 to permit air flow therebetween and other appropriate air passages of conventional form are provided between the parts so that air can reach the interior of the pump assembly by passage between the plunger and the opening 16 into the interior of the pump. In this manner, the desired replacement air is provided when needed for operation of the pump. Thus, as the pump chamber 76 is filled with the liquid to be dispensed during the retraction stroke of the plunger 74, air will pass between trigger assembly 122 and housing 114 and then through opening 16 and into the interior of the pump in the same manner as with the similar pump in U.S. Pat. No. 3,452,905.

The stroke of plunger 74 may be regulated by one of a number of conventional means; as shown in the illustrated embodiments, the end of the pumping stroke is controlled by the permissible compression of the spring 98.

Of course each of the conical surfaces 70 and 72 and their associated surfaces 94 and 92, respectively may assume different angular relations relative to the axes of the plunger 74 and may be of a shape other than conical as for example, hyperbolic or parabolic. In this connection, the selected design should as in the illustrated embodiment provide for a substantially liquid tight seal closing the radial openings 90 in the plunger 74 during the rest or non-use position of the pump 10 and particularly during the retraction stroke of the plunger 74. Naturally, the seal should provide a substantially leakproof juncture at all times between the diaphragm 52 and the plunger 74 while permitting during the pumping stroke the separation of the conical face 72 and the opposed conical face 92 to thereby permit passage therebetween of the liquid within the pump chamber 76 through the opening 90 and eventually out through the nozzle or orifice 108.

The container 11, as previously stated, may be either metal, glass or plastic or similar material. The material of the base member 20, cap 15, cap 102, outer cap 114, trigger mechanism 122 and cover plate 125 together with the plunger are preferably selected from a wide range of rigid material such as metal, plastics, hard rubber or the like. The material of the diaphragm 52 should, preferably, possess flexibility and may be selected from a wide range of natural or synthetic elastomeric material such as polyethylene, rubber, Buna, or any other flexible elastic material.

In operation of the embodiment of FIGS. 1-3, and assuming for purposes of this description that the liquid to be dispensed is contained in the pump chamber 76, either trigger handle 126 is manually depressed toward the container thereby driving actuator flange 106 and plunger 74 downward to initiate the pumping stroke. If, on the other hand, liquid is not present in the chamber 76, the following pumping cycle should be repeated until the pump is primed and liquid to be dispensed is present in the chamber 74. During the pumping cycle, the plunger 74 is forced downward. The rib 100 will engage the substantially flat face 66 of the diaphragm 52 to cause the diaphragm to deflect downwardly. Substantially simultaneously therewith, the lower conical face 72 of the boss 68 of the diaphragm 52 will, under the influence of the internal pressure built up within the pump chamber 76, separate from the conical face 92 to permit access to the openings 90.

As the flange 106 and plunger 74 are depressed, the volume of the pump chamber 76 will be reduced to force the liquid therein under pressure out through the openings 90 through the bore 88 of tube 86 to passage or opening 110 and out through the aligned discharge opening or selected nozzle 108. The maximum pumping stroke of the plunger 74 is determined by the permissible compression of spring 98. The location of actuating flange 106 also is utilized in determining the pumping stroke. Upon release of handle 126 and consequent retraction of the plunger 74 under the influence of spring 98, the pumping chamber 76 will start to expand thereby creating a suction which will draw liquid from the interior of the container up through the tube 42 through the bore of boss 40 pass the check valve 36 which will at this stage be forced to unseat. The liquid will be drawn through bore 32 into the pumping chamber 76. As the pumping chamber 76 is filled, the ambient air will flow into the container in the manner described above and in accordance with U.S. Pat. No. 3,452,905 to replenish the volume of liquid drawn into the chamber 76 from the container. The spring 98 will eventually cause the annular lip 64 of the diaphragm 52 to seat against the lower face of the wall 17 whereupon the diaphragm 52 will come to rest. The assembly will then assume the position shown in FIG. 2 at which the pumping cycle may be repeated. During the retraction of the plunger 74 and until such time as it is depressed once again, the openings 90 will have been sealed by the engagement of the conical surface 72 of the diaphragm 52 and the conical surface 92 of the plunger 74. When the deflection of the diaphragm 52 has stopped, the check valve 36 will be seated against the valve seat 34 to trap the liquid to be dispensed in the chamber 76. The above pumping cycle need only be repeated for further dispensing of the liquid.

Alternatively to facilitate seating of the ball valve 36 a helical spring 128 can be positioned between the bottom end of the plunger and the ball 36 under sufficient compression to tend to return the ball to the seated position when desired as described above. The presence of spring 128 can also facilitate metering of the volume of liquid being dispensed through the pump since the amount of force applied by spring 128 can be adjusted. Accordingly, the distance that ball 36 is unseated by the pumping forces can be adjusted in relation to the force needed to compress spring 128 thereby controlling the amount of fluid that can be drawn past ball valve 36 during the retraction stroke and accordingly drawn into pump chamber 76. Other appropriate stop means can be used in place of the end of the plunger to capture the end of the spring distal from the ball.

A further embodiment of the trigger mechanism is depicted in FIGS. 6 and 7. All other components of the dispensing pump are identical with the exception of the trigger mechanism which is shown independently in FIG. 7. The alternate form 130 includes a pair of opposed handles 132 which are integrally formed to a central rectangularly shaped body portion 134. The body portion has a central opening 136 to receive cap 102 and the upper end portion 86 of the plunger therethrough. Additionally, the body portion 134 has an upper rim for reception of cover plate 125 and its undersurface is designed for interengagement with actuating flange 106 in a similar manner as with the previous embodiment. Appropriate recesses 138 are provided where the handles 132 adjoin body portion 134 thereby facilitating pivoting of the trigger assembly 130 and reciprocation of actuating plate 106 and plunger 74. The difference in the alternate form is in the presence of a central integral hinge 140 which permits either handle 132 to be operated independent of the other handle or simultaneously with one another. This action is depicted in phantom in FIG. 6.

An appropriate recess 123 is provided in the undersurface of plate 125 to receive central hinge ribs 135 and to assist in retaining the trigger mechanism in fixed lateral position.

A second alternative form of the trigger mechanism is depicted in FIGS. 8 and 9 with the trigger mechanism 142 being shown independently and disassembled in FIG. 9. Trigger mechanism 142 has a pair of opposed handles 144 extending downwardly and away from a central body portion 146 as in the previous embodiments. Appropriate undercut recesses 148 are provided where the handle 144 adjoin body portion 146 to facilitate pivoting of the trigger mechanism. The difference in design resides in the body portion which is in the form of two U-shaped halves 150 and 152. The legs of each U-shaped half terminate in an upwardly extending shoulder 154 which engages with the undersurface of locking plate 125 to facilitate pivoting and actuation of the plunger 74. The legs of body half 152 are closer together than the legs of body half 150 to facilitate insertion of the legs of half 152 within half 150 in a telescopic manner when inserted within channel 120. Operation of the trigger and pump is identical as with the previous two embodiments with the exception that depression of one handle is independent of depression of the other handle as depicted in phantom in FIG. 8. Therefore, depression of one or both handles actuates the device. Trigger halves 144 are maintained in position by seating of shoulders 154 in receiving recesses 155 in the undersurface of plate 125.

It should be kept in mind that by varying the length of the body portion, the trigger stroke is varied and accordingly a different metered dose can be dispensed. This is enhanced further in the embodiments of FIGS. 6 and 7 and 8 and 9 where each trigger operates independently and accordingly the length of each body half in either of those embodiments can be different from the length of the other body half thereby enabling the dispensing of a different metered dose when depressing one handle from the metered dose dispensed when depressing the other of the two handles. Color coding or similar indicating means can be employed to correlate the two triggers with the two different dosages.

The telescopic arrangement of FIGS. 8 and 9 is particularly advantageous where the shortest possible trigger travel is desired. This is of use with certain types of containers where only a short dispensing stroke is desired or required.

Figure 4:
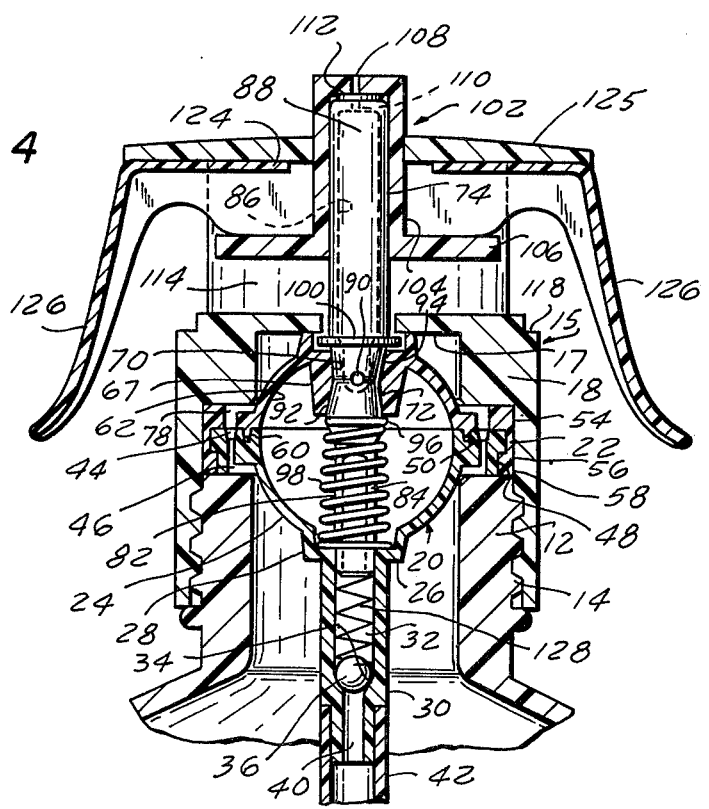
FIG. 4 is a view similar to FIG. 2 showing the pump during the pumping stroke during which liquid to be dispensed is forced out of the pump chamber through the discharge passageways.
Figure 5:
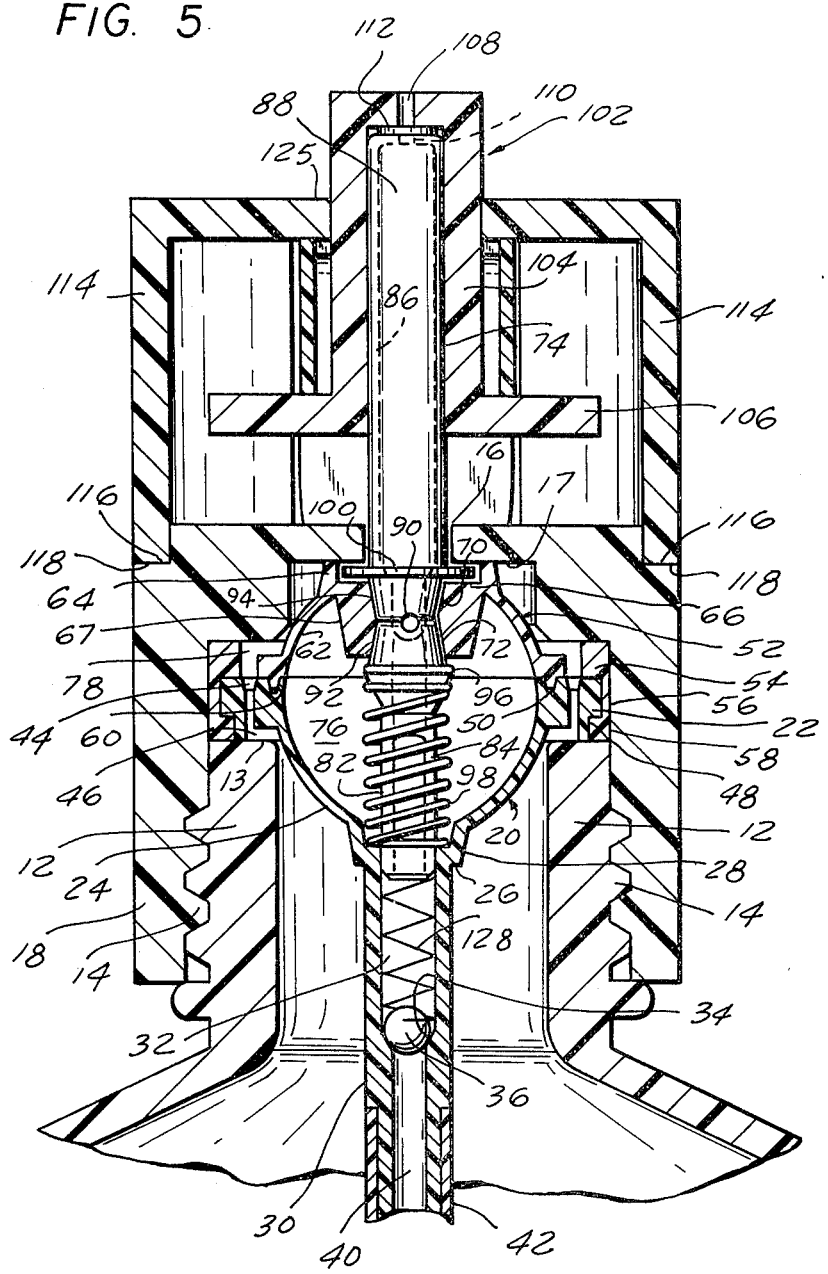
FIG. 5 is again a view similar to FIG. 2 showing the pump at the end of its retraction stroke at which liquid in the container has been forced up into the pump chamber and ambient air has been permitted to replace the liquid drawn upwardly from the container.

The spring 128 depicted in FIG. 4 is also adaptable for use with the embodiments of FIGS. 5–8 and would operate in a similar manner to control the seating of ball 36 and also as a device for controlling the metering of fluid passing through the pump.

As will be appreciated by those skilled in the art, the trigger assembly of this invention could be applied to pressure containers, such as aerosol type or gas propelled dispensing units.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. A double acting trigger mechanism for a dispensing pump of the type employing a reciprocal plunger having an axis and a passage for communicting the pump with a nozzle, the trigger mechanism including a housing, a body portion at least partly within the housing and being disposed transversely of the axis, a pair of spaced handles extending transversely from the body portion exteriorly of the housing and to permit manual engagement therewith, coupling means for coupling the trigger mechanism with the plunger, means forming a slide surface in the housing on which the body portion is adapted to slide, pivoting means for permitting pivoting of the trigger mechanism so that manual movement of either handle in a direction transverse of the axis will pivot the body portion and slide the body portion on the slide surface and move the plunger in an axial direction and release of such handle will permit the plunger to reciprocate to the original position by pivoting the body portion and handle to their original position.

2. The invention in accordance with claim 1 wherein means are provided for permitting both handles to be simultaneously manually moved.

3. The invention in accordance with claim 2 wherein an arcuate recess being formed at the point where the handles join with the body portion to facilitate pivoting of the trigger mechanism with respect to the plunger and pump.

4. The invention in accordance with claim 1 wherein the handles are diametrically opposed and are integrally formed with a unitary body portion.

5. The invention in accordance with claim 1 wherein the plunger is capped by a cylindrically shaped nozzle housing with an annular actuating flange extending laterally from the bottom end thereof and a nozzle orifice in the upper end thereof, the nozzle orifice in the cap being aligned with the opening through the upper end of the plunger and a spray means located adjacent the aligned opening and orifice to facilitate formation of a spray for passage through the nozzle orifice, a cylindrical housing for interengagement with the dispensing pump and having a central channel therethrough to receive the body portion of the trigger mechanism therein and with the end of the cap and plunger extending upwardly therethrough, a cover plate mounted on the cylindrical housing and capturing the body portion of the trigger mechanism between the undersurface of the cover plate and the upper surface of the actuating flange so that depression of one of the handles toward the cylindrical housing will pivot the body portion of the trigger and force the actuating flange cap and plunger downward in dispensing operation and release of the trigger mechanism will permit the plunger to move upward along the actuating flange and to permit the body to be pivoted along with the handles to the original position.

6. A double acting trigger mechanism for a dispensing pump of the type employing a reciprocal plunger and a passage for communicating the pump with a nozzle, the trigger mechanism including a body portion, a pair of spaced handles extending from the body portion and to permit manual engagement therewith, means for pivotally coupling the trigger mechanism with the plunger so that manual movement of either handle will pivot the body portion and move the plunger in one direction and release of such handle will permit the plunger to reciprocate to the original position by pivoting the body portion and handle to their original position, the body portion of the trigger mechanism being hollow and rectangular shaped and including a pair of longer opposed side walls centrally hinged to permit pivoting of both and one half of each side wall with respect to the other, the shorter side of the rectangular body portion integrally formed with a handle extending downwardly and away from the body portion so as to form a pair of opposed handles on the trigger mechanism, a recess on the underside of the body portion at the point where the handle joins the body portion to facilitate pivoting of the body portion with respect to the plunger and dispensing pump and the hinge permitting one handle and half of the body portion to pivot independent of movement of the other half of the body portion and interconnected handle.

7. A double acting trigger mechanism for a dispensing pump of the type employing a reciprocal plunger and a passage for communicating the pump with a nozzle, the trigger mechanism including a body portion, a pair of spaced handles extending from the body portion and to permit manual engagment therewith, means for pivotally coupling the trigger mechanism with the plunger so that manual movement of either handle will pivot the body portion and move the plunger in one direction and release of such handle will permit the plunger to reciprocate to the original position by pivoting the body portion and handle to their original position, the body portion of the trigger mechanism being formed of two separate U-shaped members the open side of which terminating in a pair of upstanding pivot shoulders and the closed end of which being integrally connected with a handle extending downwardly and away from each separate half of the body portion, the undersurface of each U-shaped portion containing a recess at the location where the handle is joined therewith to facilitate pivoting of both and individually each of the handle and body portion half with respect to the plunger and dispensing pump when interconnected therewith, each half of the body portion being extendible from opposite sides of the dispensing pump into interengagement therewith, the legs of one U-shaped half of the body portion being closer together than the legs of the other U-shaped body portion half so that when the body portion is extended into operable position with respect to the plunger the legs of one half telescoped within the legs of the other half and the undersurface of the legs of each half and the projecting pivot shoulders of each half interengaged with appropriate surfaces on the plunger and dispensing pump to permit independent pivoting of each handle and trigger mechanism body half and corresponding reciprocation of the plunger and operation of the dispensing pump.

8. The invention in accordance with claim 7 wherein the lengths of the portions of the trigger mechanism can be of predetermined lengths so as to enable varied needed doses of fluid to be dispensed.

9. A dispensing pump for use and incorporation on a container for material to be dispensed comprisingly in combination:
   a relatively rigid base member adapted to be supported across the opening of a container;
   said member having an opening and means for communicating said opening with the material to be dispensed;
   first valve means for closing the opening during the dispensing of said material and unseating to provide communication between the opening and the material to be dispensed in the container;

a relatively movable member movable relative to the rigid base having peripheral portions thereon in fluid tight engagement with associated portions of the base member;

said movable member including a central boss defining a central opening;

a reciprocal plunger extending into the central opening of the movable member;

said plunger having surfaces cooperable with associated surfaces of the boss in providing means for attaching the plunger to the movable member for permitting movement of the movable member upon reciprocation of the plunger;

the plunger having an interior passage for the dispensing of the material to be dispensed;

the plunger and the base member and the movable member cooperating with one another in defining a pump chamber for containing the material to be dispensed;

the plunger having an opening communicating with the plunger passage and adapted to communicate with the pump chamber for permitting flow of the material from the pump chamber into the plunger passage;

surfaces of the plunger adjacent the plunger opening and associated surfaces of the boss defining a second valve means for sealing the plunger opening during filling of the pump chamber and for opening the plunger opening during dispensing of the material to be dispensed from the pump chamber into the plunger passage;

air network means for permitting the passage of air from the ambient into the container to replenish the volume of the material to be dispensed which is drawn from the container interior into the pump chamber;

the movable member when moved by the plunger in one direction, for pumping, toward the base member being adapted to reduce the volume of the pump chamber thereby pressurizing the material to be dispensed in the pump chamber and at the same time causing the second valve means to open the plunger opening whereupon the material in the pump chamber is adapted to flow into the plunger passage and be dispensed therefrom;

the movable member when moved in the opposite direction away from the base member upon retraction of the plunger increasing the volume of the pump chamber and closing the plunger opening by the second valve means and causing the unseating of the first valve means to open the base member opening to the material to be dispensed in the container thereby permitting the material to be dispensed in the container to enter the pump chamber with the first valve means closing the base member opening upon termination of the retraction of the plunger and movement of the movable member away from the base member as well as during pumping and dispensing of the material to be dispensed; and a double acting and handled trigger mechanism mounted on the plunger and adapted to be actuated by movement of at least one of the handles whereupon depression thereof will move the plunger in one direction for pumping and release of the trigger handle thereafter will permit the plunger to return to the original position and permit the material to be dispensed to enter the pump chamber, the reciprocal plunger having an axis, the trigger mechanism including a housing, a body portion at least partly within the housing and being disposed transversely of the axis, a pair of spaced handles extending transversely from the body portion exteriorly of the housing and to permit manual engagement therewith, coupling means for coupling the trigger mechanism with the plunger, means forming a slide surface in the housing, on which the body is adapted to slide, pivoting means for permitting pivoting of the trigger mechanism so that manual movement of either handle in a direction transverse of the axis will pivot the body portion and slide the body portion on the slide surface and move the plunger in an axial direction and release of such handle will permit the plunger to reciprocate to the original position by pivoting the body portion and handle to their original position.

10. The invention in accordance with claim 9 wherein the coupling means including a cap surrounding the upper end of the plunger and includes an orifice therein in alignment with the opening at the upper end of the plunger along with the surrounding surfaces to facilitate the formation of a spray through the orifice in the cap when material is dispensed, the cap terminating in a laterally extending actuating flange intermediate the ends of the plunger, the housing including a cylindrical cover mounted in fixed position on the base member and including a diametrically extending channel centrally located with the upper portion of the plunger and cap extending upwardly therethrough, a cover plate affixed to the cylindrical member and substantially parallel to and spaced from the actuating flange and containing an opening for passage of the upper portion of the plunger and cap therethrough, the space between the cover plate and the actuating flange forming a receiving recess for the body portion of the double handled trigger mechanism with the handles being diametrically opposed and extending downwardly and away from the channel and the remainder of the dispensing pump.

11. The invention in accordance with claim 9 wherein a spring is positioned between the first valve means and the relatively rigid base members tending to bias the first valve means into the seated position thereby facilitating return of the first valve means to the seated position and maintaining the priming of the pump over relatively long periods of time and also permitting the metering of fluid at a controlled rate during the dispensing process.

12. A dispensing pump for use and incorporation on a container for material to be dispensed comprising in combination:

a relatively rigid base member adapted to be supported across the opening of a container;

said member having an opening and means for communicating said opening with the material to be dispensed;

first valve means for closing the opening during the dispensing of said material and unseating to provide communication between the opening and the material to be dispensed in the container;

a relatively movable member movable relative to the rigid base having peripheral portions thereon in fluid tight engagement with associated portions of the base member;

said movable member including a central boss defining a central opening;

a reciprocal plunger extending into the central opening of the movable member;

said plunger having surfaces cooperable with associated surfaces of the boss in providing means for attaching the plunger to the movable member for permitting movement of the movable member upon reciprocation of the plunger;

the plunger having an interior passage for the dispensing of the material to be dispensed;

the plunger and the base member and the movable member cooperating with one another in defining a pump chamber for containing the material to be dispensed;

the plunger having an opening communicating with the plunger passage and adapted to communicate with the pump chamber for permitting flow of the material from the pump chamber into the plunger passage;

surfaces of the plunger adjacent the plunger opening and associated surfaces of the boss defining a second valve means for sealing the plunger during filling of the pump chamber and for opening the plunger opening during dispensing of the material to be dispensed from the pump chamber into the plunger passage;

air network means for permitting the passage of air from the ambient into the container to replenish the volume of the material to be dispensed which is drawn from the container interior into the pump container;

the movable member when moved by the plunger in one direction, for pumping, toward the base member being adapted to reduce the volume of the pump chamber thereby pressurizing the material to be dispensed in the pump chamber and at the same time causing the second valve means to open the plunger opening whereupon the material in the pump chamber is adapted to flow into the plunger passage and be dispensed therefrom;

the movable member when moved in the opposite direction away from the base member upon retraction of the plunger increasing the volume of the pump chamber and closing the plunger opening by the second valve means and causing the unseating of the first valve means to open the base member opening to the material to be dispensed in the container thereby permitting the material to be dispensed in the container to enter the pump chamber with the first valve means closing the base member opening upon termination of the retraction of the plunger and movement of the movable member away from the base member as well as during pumping and dispensing of the material to be dispensed; and a double acting and handled trigger mechanism mounted on the plunger and adapted to be actuated by movement of at least one of the handles whereupon depression thereof will move the plunger in one direction for pumping and release of the trigger handle thereafter will permit the plunger to return to the original position and permit the material to be dispensed to enter the pump chamber, wherein a cap surrounds the upper end of the plunger and includes an orifice therein in alignment with the opening at the upper end of the plunger along with surrounding surfaces to facilitate the formation of a spray through the orifice in the cap when material is dispensed, the cap terminating in a laterally extending actuating flange intermediate the ends of the plunger, a cylindrical cover mounted in fixed position on the base member and including a diametrically extending channel centrally located with the upper portion of the plunger and cap extending upwardly therethrough, a cover plate affixed to the cylindrical member and substantially parallel to and spaced from the actuating flange and containing an opening for passage of the upper portion of the plunger and cap therethrough, the space between the cover plate and the actuating flange forming a receiving recess for a body portion of the double handled trigger mechanism with the handles being diametrically opposed and extending downwardly and away from the channel and the remainder of the dispensing pump, the double handled trigger mechanism including a rectangularly shaped body portion having a central aperture and being positioned in the channel between the cover plate and the actuating flange and having the top of the plunger and cap extending therethrough, a handle extending from each shorter side of the rectangular body portion and extending downwardly and away from the body portion, a recess on the underside of the body portion at the point where each handle extends therefrom to facilitate pivoting of the body portion upon movement of the handle toward the dispensing pump so as to depress the actuating flange and plunger and dispense fluid from the pump and upon release of the handle the plunger and actuating flange will return to the initial position along with the handle.

13. A dispensing pump for use and incorporation on a container for material to be dispensed comprising in combination:

a relatively rigid base member adapted to be supported across the opening of a container;

said member having an opening and means for communicating said opening with the material to be dispensed;

first valve means for closing the opening during the dispensing of said material and unseating to provide communication between the opening and the material to be dispensed in the container;

a relatively movable member movable relative to the rigid base having a peripheral portions thereon in fluid tight engagement with associated portions of the base member;

said movable member including a central boss defining a central opening;

a reciprocal plunger extending into the central opening of the movable member;

said plunger having surfaces cooperable with associated surfaces of the boss in providing means for attaching the plunger to the movable member for permitting movement of the movable member upon reciprocation of the plunger;

the plunger having an interior passage for the dispensing of the material to be dispensed;

the plunger and the base member and the movable member cooperating with one another in defining a pump chamber for containing the material to be dispensed;

the plunger having an opening communicating with the plunger passage and adapted to communicate with the pump chamber for permitting flow of the material from the pump chamber into the plunger passage;

surfaces of the plunger adjacent the plunger opening and associated surfaces of the boss defining a second valve means for sealing the plunger opening during filling of the pump chamber and for opening the plunger opening during dispensing of the material to be dispensed from the pump chamber into the plunger passage;

air network means for permitting the passage of air from the ambient into the container to replenish the volume of the material to be dispensed which is drawn from the container interior into the pump chamber;

the movable member when moved by the plunger in one direction, for pumping, toward the base member being adapted to reduce the volume of the pump chamber thereby pressurizing the material to be dispensed in the pump chamber and at the same time causing the second valve means to open the plunger opening whereupon the material in the pump chamber is adapted to flow into the plunger passage and be disengaged therefrom;

the movable member when moved in the opposite direction away from the base member upon retraction of the plunger increasing the volume of the pump chamber and closing the plunger opening by the second valve means and causing the unseating of the first valve means to open the base member opening to the material to be dispensed in the container thereby permitting the material to be dispensed in the container to enter the pump chamber with the first valve means closing the base member opening upon termination of the retraction of the plunger and movement of the movable member away from the base member as well as during pumping and dispensing of the material to be disposed; and a double acting and handled trigger mechanism mounted on the plunger and adapted to be actuated by movement of at least one of the handles whereupon depression thereof will move the plunger in one direction for pumping and release of the trigger handle thereafter will permit the plunger to return to the original position and permit the material to be dispensed to enter the pump chamber, the double handled trigger mechanism including a rectangularly shaped body portion mounted between the cover plate and the actuating flange and in engagement with each, a hinge intermediate the longer sides of the body portion, a handle extending from each shorter side of the body portion and accordingly being diametrically opposed with respect to the dispensing pump, a recess on each longer side of the undersurface of the body portion at the point where the body portion is interconnected with a handle to facilitate pivotal movement of one half of the hinged body portion upon depression of a handle so as to move the actuating flange downward and accordingly move the plunger downward and dispense fluid from the pump and whereupon release of the handle will permit the plunger to return to the initial configuration along with the actuating flange and handle.

14. A dispensing pump for use and incorporation on a container for material to be dispensed comprising in combination:

a relatively rigid base member adpated to be supported across the opening of a container;

said member having an opening and means for communicating said opening with the material to be dispensed;

first valve means for closing the opening during the dispensing of said material and unseating to provide communication between the opening and the material to be dispensed in the container;

a relatively movable member movable relative to the rigid base having peripheral portions thereon in fluid tight engagement with associated portions of the base member;

said movable member including a central boss defining a central opening a reciprocal plunger extending into the central opening of the movable member;

said plunger having surfaces cooperable with associated surfaces of the boss in providing means for attaching the plunger to the movable member for permitting movement of the movable member upon reciprocation of the plunger;

the plunger having an interior passage for the dispensing of the material to be dispensed;

the plunger and the base member and the movable member cooperating with one another in defining a pump chamber for containing the material to be dispensed;

the plunger having an opening communicating with the plunger passage and adapted to communicate with the pump chamber for permitting flow of the material from the pump chamber into the plunger passage;

surfaces of the plunger adjacent the plunger opening and associated surfaces of the boss defining a second valve means for sealing the plunger opening during filling of the pump chamber and for opening the plunger opening during dispensing of the material to be dispensed from the pump chamber into the plunger passage;

air network means for permitting the passage of air from the ambient into the container to replenish the volume of the material to be dispensed which is drawn from the container interior into the pump container;

the movable member when moved by the plunger in one direction, for pumping, toward the base member being adapted to reduce the volume of the pump chamber thereby pressurizing the material to be dispensed in the pump chamber and at the same time causing the second valve means to open the plunger opening whereupon the material in the pump chamber is adapted to flow into the plunger passage and be dispensed therefrom;

the movable member when moved in the opposite direction away from the base member upon retraction of the plunger increasing the volume of the pump chamber and closing the plunger opening by the second valve means and causing the unseating of the first valve means to open the base member opening to the material to be dispensed in the container thereby permitting the material to be dispensed in the container to enter the pump chamber with the first valve means closing the base member opening upon termination of the retraction of the plunger and movement of the movable member away from the base member as well as during pumping and dispensing of the material to be dispensed; and a double acting and handled trigger mechanism mounted on the plunger and adapted to be actuated by movement of at least one of the handles whereupon depression thereof will move the plunger in one direction for pumping and release of the trigger handle thereafter will permit the plunger to return to the original position and permit the material to be dispensed to enter the pump chamber, the double handled trigger mechanism including a body portion of two separate U-shaped members, the closed end of each U-shaped member having a handle extending downwardly and away therefrom and the open end of each U-shaped body portion having an upwardly projecting shoulder extending from the end of each leg thereof, a recess in the undersurface of each leg of U-shaped portion to facilitate pivoting thereof with respect to the plunger, the legs of one U-shaped portion of the body being closer together than the legs of the other U-shaped portion to facilitate insertion of one pair of legs within the other when the double handled trigger mechanism is positioned with the body portion within the channel and the configuration of the body portion facilitating the depression of either handle to move the actuating flange and plunger in one direction to dispense fluid and upon release of the handle to permit the plunger to return to the initial position along with the actuating flange and handle which was depressed.

15. A double acting trigger mechanism for a dispenser of the type having a reciprocal stem having an axis and a passage for communicating container contents with a nozzle, the trigger mechanism including a housing, a body portion at least partly within the housing and being disposed transversely of the axis, a pair of spaced handles extending transversely from the body portion exteriorly of the housing and to permit manual engagement therewith, coupling means for coupling the trigger mechanism with the stem, means forming a slide surface in the housing on which the body portion is adapted to slide, pivoting means for permitting pivoting of the trigger mechanism so that manual movement of either handle in a direction transverse of the axis will pivot the body portion and slide the body portion on the slide surface and move the stem in an axial direction and release of such handle will permit the stem to reciprocate to the original position by pivoting body portion and handle to their original position.

16. The invention in accordance with claim 15, wherein means are provided for permitting both handles to be simultaneously manually moved.

17. The invention in accordance with claim 15, wherein the body portion of the trigger mechanism is defined by at least one pair of hinged members whereby either one or both of the handles may be manually engaged to facilitate pivoting of the body portion.

18. The invention in accordance with claim 15, wherein the body portion of the trigger mechanism is defined by at least one pair of separate members whereby either one or both of the handles may be manually engaged to facilitate pivoting of the body portion.

* * * * *

UNITED STATES PATENT OFFICE
CERTIFICATE OF CORRECTION

PATENT NO. : 4,033,487
DATED : July 5, 1977
INVENTOR(S) : LEWIS A. MICALLEF

It is certified that error appears in the above-identified patent and that said Letters Patent are hereby corrected as shown below:

Column 1, line 39, "from" should be --for--;

Column 9, line 58 "a" (second occurrence) should be --the--;

Column 10, line 48, "of" should be --on--;

Column 12, line 10, after "body" insert --portion--;

Column 13, line 30, "container" should be --chamber--;

Column 15, line 23, "disengaged" should be --dispensed--;

Column 15, lines 37 and 38, "disposed" should be --dispensed--;

Column 16, line 1, "adpated" should be --adapted--;

Column 16, line 46, "container" should be --chamber--;

Column 17, line 18, after "of" (second occurrence) insert --the--.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*